¹ United States Patent Office 3,366,448
Patented Jan. 30, 1968

3,366,448
METHOD FOR TREATMENT OF IMPURE PHOSPHORIC ACID SOLUTIONS TO PRODUCE PURIFIED PHOSPHORIC ACID
Michel Martin, Paris, and Louis Winand, Creteil, France, assignors of fifty percent each to Produits Chimiques Pechiney-Saint-Gobain, Neuilly-sur-Seine, France, and Union Chimique Chemische, Bedrijven, Brussels, Belgium
No Drawing. Filed Jan. 12, 1966, Ser. No. 520,070
Claims priority, application France, Jan. 18, 1965, 2,340; Oct. 21, 1965, 35,780
18 Claims. (Cl. 23—165)

ABSTRACT OF THE DISCLOSURE

In the process of purifying wet process acid by liquid extract ion with organic solvents, fluoride ions are introduced into the system to prevent the formation and accumulation of gelatinous silica.

This invention relates to the purification of phosphoric acid obtained by the treatment of phosphate rock with sulphuric acid and it relates more particularly to a process for the solvent separation of purified phosphoric acid by the use of a water immiscible organic solvent system.

The extraction of phosphoric acid from phosphate rock has become a very important industry. Extraction by solubilization is achieved by treatment of the rock with sulphuric acid to produce a slurry containing the impure phosphoric acid and which has normally been employed as a component in a fertilizer composition. It would be desirable to be able to effect separation of a purified phosphoric acid from such slurry for use in applications which are presently limited to phosphoric acid that is obtained by the combustion of phosphorus.

Suggestions have been made over a long period of time for purification of the impure phosphoric acid in the slurry by means of solvent extraction. Numerous difficulties and problems have been encountered from the attempts to reduce such purification process to commercial practice. The difficulties stem, in part, from the formation and accumulation of gelatinous silica which lines the passages and otherwise interferes with the flow of fluids necessary to carry out the process in a continuous operation for commercial practice. In a copending application of Roger Champ et al., filed Jan. 3, 1966, and entitled "Purification of Phosphoric Acid Derived from Phosphate Rock," description is made of a process wherein anions of boron, such as in the form of boric acid, are introduced with the impure phosphoric acid to enable purified phosphoric acid to be separated by a water immiscible organic solvent without the formation of undesirable silica gel or other interfering bodies. The phosphoric acid secured by the process described is accompanied with impurities, such as sulphur, fluorine, silica and boron. While purified phosphoric acid can be separated from such impurities to complete its purification, or is otherwise suitable for the fabrication of products which become purified upon crystallization, it is desirable and it is an object of this invention to provide a continuous process for the purification of phosphoric acid obtained from phosphate rock which is free of interferences resulting from the formation of silica gel and which yields a phosphoric acid from which the anion impurities are still easier to eliminate.

It is another object of this invention to provide a method and means for the purification of phosphoric acid obtained by the treatment of phosphate rock with an acid such as sulphuric acid; which can be practiced as a continuous operation with the countercurrent flow of fluids for extraction; which makes use of a minimum amount of equipment and labor and readily available raw materials thereby to provide a low cost and efficient process for the production of phosphoric acid, and which produces a relatively pure and easily purifiable phosphoric acid in a simple and efficient manner.

In accordance with the practice of this invention, addition is made of hydrofluoric acid to the impure sulphuric acid solution resulting from the acid treatment of phosphate rock. The impure phosphoric acid having the hydrofluoric acid added is extracted in a continuous countercurrent flow system with a water immiscible organic solvent in which a part of the phosphoric acid is removed by solution. The phosphoric acid-water insoluble solvent system is thereafter extracted in a countercurrent flow contact process with water which removes dissolved phosphoric acid from solution in the water immiscible organic solvent. The water immiscible organic solvent from which the dissolved phosphoric acid has been removed, after separation from the water phase, is recycled for re-contact with the impure phosphoric acid for re-use in extraction of purified phosphoric acid therefrom. Thus the water immiscible organic solvent serves as an intermediate for removing purified phosphoric acid from the slurry for transmission to the water and return in a continuous recycling operation thereby to conserve on the amount of raw material employed in the purification process.

The hydrofluoric acid can be added to the impure phosphoric acid prior to contact with the water immiscible organic solvent in the form of gaseous hydrogen fluoride or as a liquid or as a combined solute such as a soluble fluoride. Instead, the hydrofluoric acid component can be added to the extract of the purified phosphoric acid in the water immiscible organic solvent system.

When the described procedure is followed, the process can be operated continuously over a long period of time without interference resulting from the appearance of gelatinous silica in the contact towers or passages for the countercurrent flow of liquids. It is believed that this results from the modification of the ratio that exists between the fluorine and silica in the impure phosphoric acid system whereby the ratio is maintained sufficiently low for holding the fluosilicic acids in the dissolved state during the entire extraction cycle.

The purified phosphoric acid secured in accordance with the practice of this invention will still be accompanied by sulphur, silica and fluorine and derivatives thereof but these elements do not interfere with the use of the phosphoric acid in the preparation of various phosphates and from which the phosphate can be produced in a purified state by crystallization. The purified phosphoric acid can be freed of the accompanying anions, for other uses, by other well known purification processes such as ion exchange with complex amines or by precipitation of insoluble salts, as in the preparation of barium phosphates.

The following examples, which are given by way of illustration, but not by way of limitation, will describe a complete cycle of operation for the separation of purified phosphoric acid from impure phosphoric acid obtained by the treatment of phosphate rock with sulphuric acid in which the addition of hydrofluoric acid is made after the organic extraction phase and including the elimination of anions by the insertion of barium salts between the steps of acidification with hydrofluoric acid and the water extraction step in one example, and in which the fluorine is introduced by way of a solution of ammonium fluoride with precipitation to remove anions as barium salts, in a second example.

Example 1

In this example, the process is carried out with the materials maintained at a temperature of at least 50° C.

by the addition of heat wherever necessary. The impure phosphoric acid which is obtained by the treatment of apatite of Togo with sulphuric acid and filtered, analyzes as 35% by weight $P_2O_5$ plus the following impurities based upon the amount of $P_2O_5$:

|  | P.p.m. |
|---|---|
| Al | 4,700 |
| Fe | 18,200 |
| Cr | 228 |
| Hg | 2,140 |

|  | Percent |
|---|---|
| $SO_4$ | 4.2 |
| F | 3.7 |
| $SiO_2$ | 2.2 |

In the process, one part by volume of the filtered impure phosphoric acid is extracted by passage in countercurrent flow in contact with two volumes of tributylphosphate, preferably in a three-stage contact tower. The aqueous phase separates from the organic phase in which purified phosphoric acid has been extracted by solution from the impure phosphoric acid. The separated aqueous phase still contains about 27% by weight $P_2O_5$ and can be concentrated for subsequent use as a fertilizer component and the like. The separated organic phase of tributylphosphate containing purified phosphoric acid extracted from the impure phosphoric acid solution is mixed with 0.02% by volume of a 20% solution of hydrofluoric acid. The water that is introduced with the hydrofluoric acid solution can be removed by decantation.

The resulting solution is mixed with two volumes of a 0.3 molar solution of barium phosphate in phosphoric acid containing 27% $P_2O_5$ to precipitate barium sulfate and barium fluosilicate which is retained in the system as a slurry. The solids are removed by centrifugal separation, the spent barium being added to the slurry as barium carbonate.

The solution of phosphoric acid in tributylphosphate is thereafter extracted with 0.5 volumes of water by a contact process with the materials traveling in countercurrent flow through a six-stage extractor to provide a separable aqueous phase containing 28% by weight purified $P_2O_5$ accompanied with the following impurities based upon the amount of $P_2O_5$:

|  | P.p.m. |
|---|---|
| Al | ≤88 |
| Fe | 30 |
| Cr | ≤2 |
| Hg | ≤70 |

|  | Percent |
|---|---|
| $SO_4$ | <0.07 |
| F | 0.14 |
| $SiO_2$ | 0.11 |

The separated tributylphosphate from which the phosphoric acid has been extracted by the water is able to redissolve additional amounts of phosphoric acid therein and is therefore recycled to the impure phosphoric acid for extraction of purified phosphoric acid in the first extraction step, preferably after purification by caustic soda, such as a molar solution thereof. The purification step can be carried out by use of 0.1 volume of a molar solution of caustic soda per 0.2 volumes of the tributylphosphate. The tributylphosphate is regenerated by the treatment even though contaminated originally with organic dyestuffs and traces of polysilicic acids which are present despite the treatment with hydrofluoric acid.

Example 2

The process of this example is carried out at a temperature of about 50° C. with the addition of heat wherever necessary. One volume of impure solution of phosphoric acid containing 35% $P_2O_5$, resulting from the treatment of apatite of Togo with sulphuric acid and filtered, is submitted to a partial extraction with two volumes of tributylphosphate in a two-stage countercurrent flow extractor. The impure phosphoric acid originally contained the following impurities based upon the amount of $P_2O_5$:

|  | P.p.m. |
|---|---|
| Al | 4,700 |
| Fe | 18,200 |
| Cr | 228 |
| Hg | 2,140 |

|  | Percent |
|---|---|
| $SO_4$ | 4.2 |
| F | 3.7 |
| $SiO_2$ | 2.2 |

At the first stage of the extraction, addition is made of 400 grams per liter of a solution of ammonium fluoride in the ratio of 3 grams of fluoride per liter of impure phosphoric acid.

The organic phase which is separated from the aqueous phase is thereafter extracted with 0.5 volume of water in a six-stage extractor through which the materials are passed in countercurrent flow.

The aqueous phase, containing the purified phosphoric acid extracted from the organic phase, is accompanied with the following impurities in amounts based upon the amount of $P_2O_5$:

|  | P.p.m. |
|---|---|
| Al | 25 |
| Fe | 290 |
| Cr | ≤2 |
| Mg | ≤3 |
| Mn | ≤3 |
| V | ≤3 |
| As | 70 |
| $SO_4$ | 10,000 |
| F | 10,800 |
| $SiO_2$ | 5,640 |

The tributylphosphate separated from the aqueous extraction is purified by treatment with caustic soda and recycled to the first extraction step for taking up purified phosphoric acid from the impure phosphoric acid solution.

The hydrofluoric acid, in the form of the acid or a soluble derivative thereof, can be added to the impure acid before the initial extraction step or during the extraction step as described in the foregoing examples. It may be added to the filtered impure acid before extraction with the tributylphosphate.

By way of modification, the aqueous phase that is separated after extraction with tributylphosphate can be concentrated and treated again by contact with tributylphosphate in a second extraction step to remove additional amounts of purified phosphoric acid from the original impure solution thereby to achieve higher recovery.

By way of further modification, the impure phosphoric acid can be treated with activated carbon to effect removal of color or other dyestuff before the extraction steps and/or by treatment of the raw acid with hydrofluoric acid at different stages of the extraction in addition to the initial treatment.

Instead of tributyl phosphate, as the water immiscible organic solvent, use can be made of other alkyl phosphates or other water immiscible organic solvents which are subject to the same problems as tributylphosphate in enabling the formation of silica gel in the absence of hydrofluoric acid and which are immiscible with water to enable separation after water extraction and in which the purified phosphoric acid is soluble. Tributylphosphate has been used in the examples as a preferred material because it is readily available as an industrial product.

It will be understood that the process is not limited with respect to the volume of liquids employed for extraction purposes and that the ratio of hydrofluoric acid or other soluble fluorides which may be substituted therefor may be varied over rather wide limits.

It will be further understood that other changes may be made in the details of the condition of operations and materials without departing from the spirit of the invention, especially as defined in the following claims.

We claim:
1. In the process for separation of a purified phosphoric acid from an impure phosphoric acid solution resulting from the acid treatment of phosphate rock, the steps of contacting the impure phosphoric acid solution with a water immiscible organic solvent for the phosphoric acid to extract phosphoric acid from the impure phosphoric acid solution in a first extraction step, separating the product from the first extraction step into a water immiscible organic solvent phase and an aqueous phase containing impure phosphoric acid, contacting the water immiscible organic solvent phase from the first extraction step with water to extract purified phosphoric acid from the water immiscible organic solvent phase in a second extraction step, separating the product from the second extraction step into a water phase containing the purified phosphoric acid and a water immiscible organic solvent phase from which phosphoric acid has been extracted by the water, and adding ions of fluorine to the system in advance of the second extraction step, in amounts sufficient to prevent the formation and accumulation of gelatinous silica.

2. The process as claimed in claim 1 in which the ions of fluorine are introduced as a compound selected from the group consisting of hydrofluoric acid and a water soluble fluoride.

3. The process as claimed in claim 1 in which the ions of fluorine are introduced into the impure phosphoric acid solution.

4. The process as claimed in claim 1 in which the ions of fluorine are introduced during the first extraction step.

5. The process as claimed in claim 1 in which the ions of fluorine are introduced to the water immiscible organic solvent phase separated from the first extraction step.

6. The process as claimed in claim 1 in which the ions of fluorine are introduced as hydrofluoric acid in the ratio of one part by weight of hydrofluoric acid to 50–150 parts by weight of phosphoric acid calculated as $P_2O_5$.

7. The process as claimed in claim 1 which includes the step of filtering the impure phosphoric acid solution before the first extraction step.

8. The process as claimed in claim 1 in which the contact between the impure phosphoric acid solution and the water immiscible organic solvent is carried out as a continuous operation with the materials in countercurrent flow.

9. The process as claimed in claim 1 in which the contact between the water immiscible organic solvent phase resulting from the first extraction step and the water is carried out in a continuous operation with the materials passing in countercurrent flow.

10. The process as claimed in claim 1 in which the water immiscible organic solvent is tributylphosphate.

11. The process as claimed in claim 1 which includes the step of recycling the water immiscible organic solvent separated from the second extraction step to the first extraction step.

12. The process as claimed in claim 11 which includes the step of treating the water immiscible organic solvent phase separated from the second extraction step with caustic soda for purification before recycling to the first extraction step.

13. The process as claimed in claim 1 which includes the step of concentrating the aqueous phase resulting from the first extraction step and contacting the concentrate with another increment of the water immiscible organic solvent for extraction of additional amounts of phosphoric acid.

14. The process as claimed in claim 1 which includes the step of treating the impure phosphoric acid solution with activated carbon before the first extraction step.

15. The process as claimed in claim 1 in which the contact between the impure phosphoric acid solution and the water immiscible organic solvent is in the ratio of about one part by volume of the impure phosphoric acid solution to two parts by volume of the water immiscible organic solvent.

16. The process as claimed in claim 3 in which the fluoride ion is introduced in the form of an aqueous hydrofluoric acid solution and in which the water introduced with the solution of hydrofluoric acid is removed from the water immiscible organic solvent phase before the second extraction step.

17. The process as claimed in claim 1 which includes the steps of adding a soluble barium salt to the water immiscible organic solvent phase separated from the first extraction step to precipitate insoluble barium salts, and separating the precipitate from the water immiscible organic solvent phase before the second extraction step.

18. The process as claimed in claim 17 in which the barium removes sulfate and fluosilicates as the corresponding barium salts.

References Cited
UNITED STATES PATENTS

| | | | |
|---|---|---|---|
| 2,955,918 | 10/1960 | Ruehrwein | 23—165 |
| 3,298,782 | 1/1967 | Archambault | 23—165 |

OSCAR R. VERTIZ, *Primary Examiner.*

A. GREIF, *Assistant Examiner.*